No. 727,547. PATENTED MAY 5, 1903.
H. C. LA FLAMBOY.
MATCH MACHINE.
APPLICATION FILED MAR. 27, 1902.
NO MODEL. 6 SHEETS—SHEET 2.
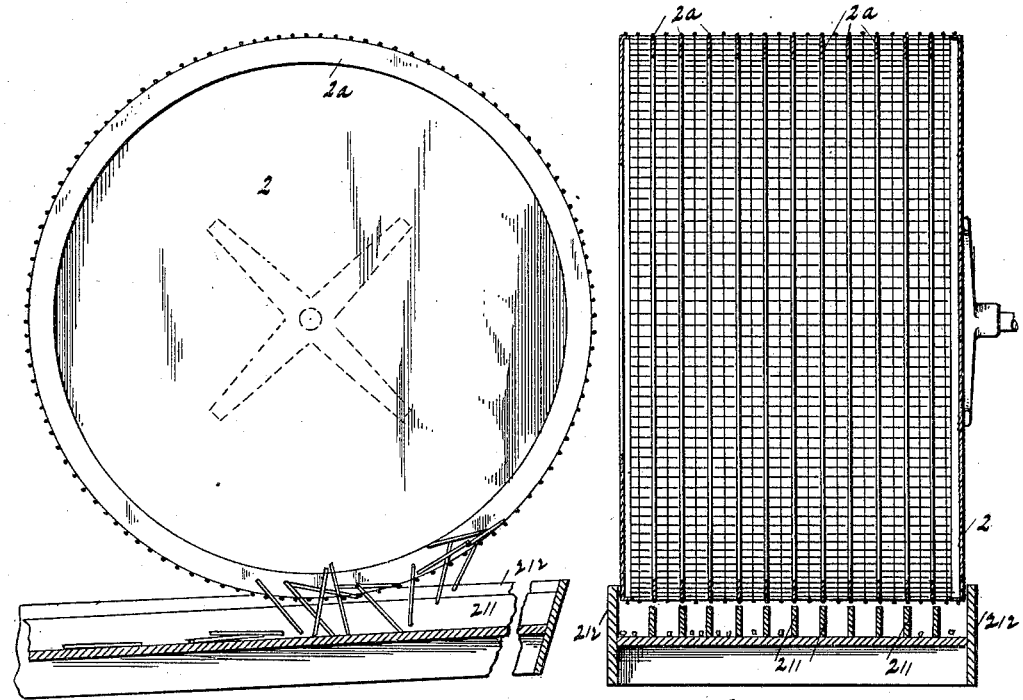
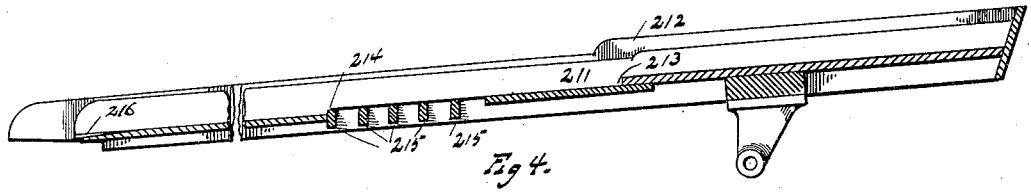
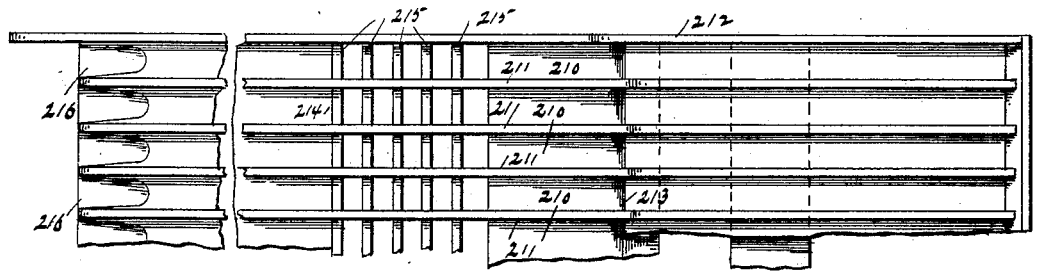
WITNESSES
Lotta Lee Hayton.
J. H. Massey.
INVENTOR
Harry C. La Flamboy
By
Parker & Burton Attorneys.

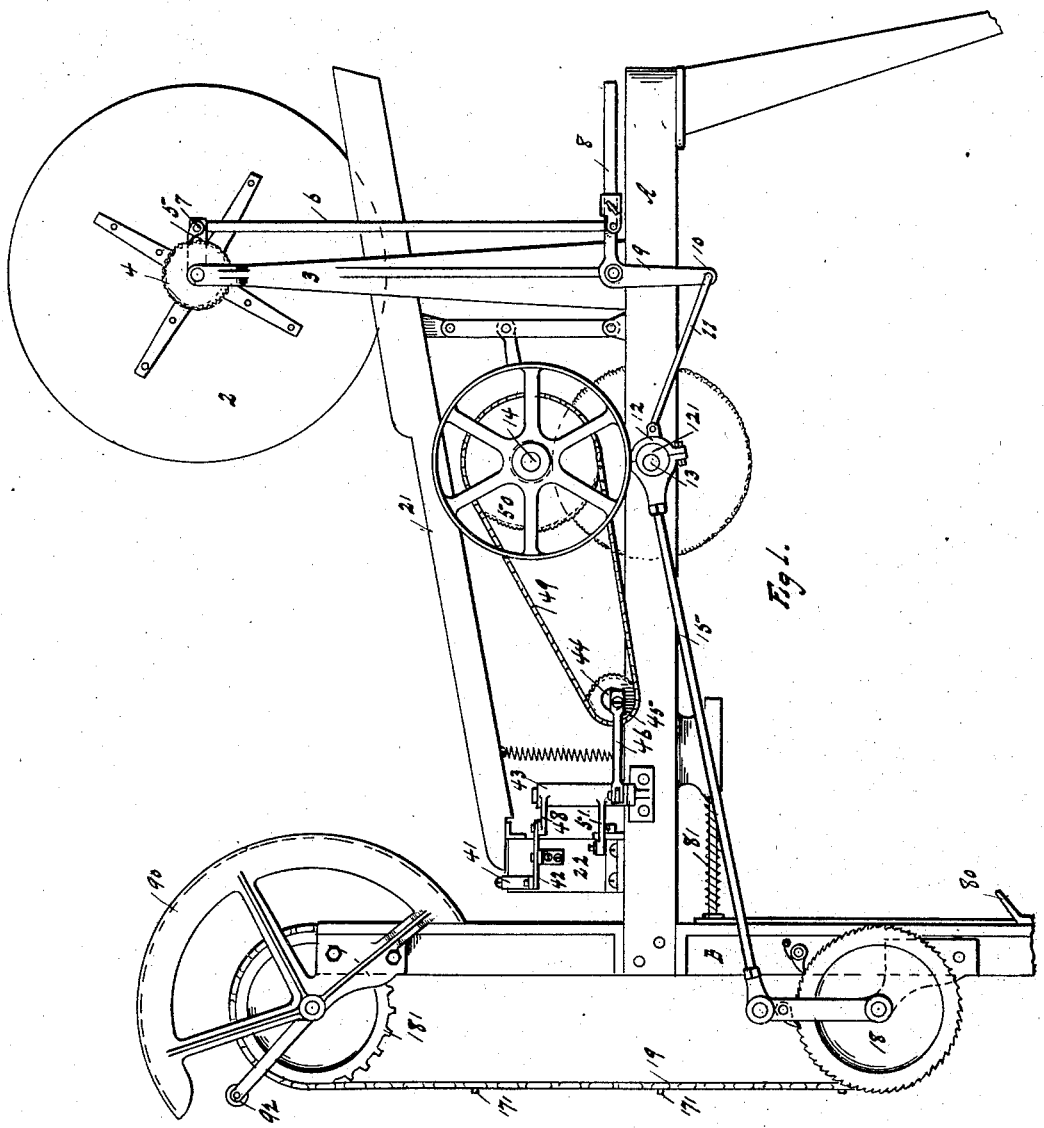

No. 727,547. PATENTED MAY 5, 1903.
H. C. LA FLAMBOY.
MATCH MACHINE.
APPLICATION FILED MAR. 27, 1902.
NO MODEL. 6 SHEETS—SHEET 3.
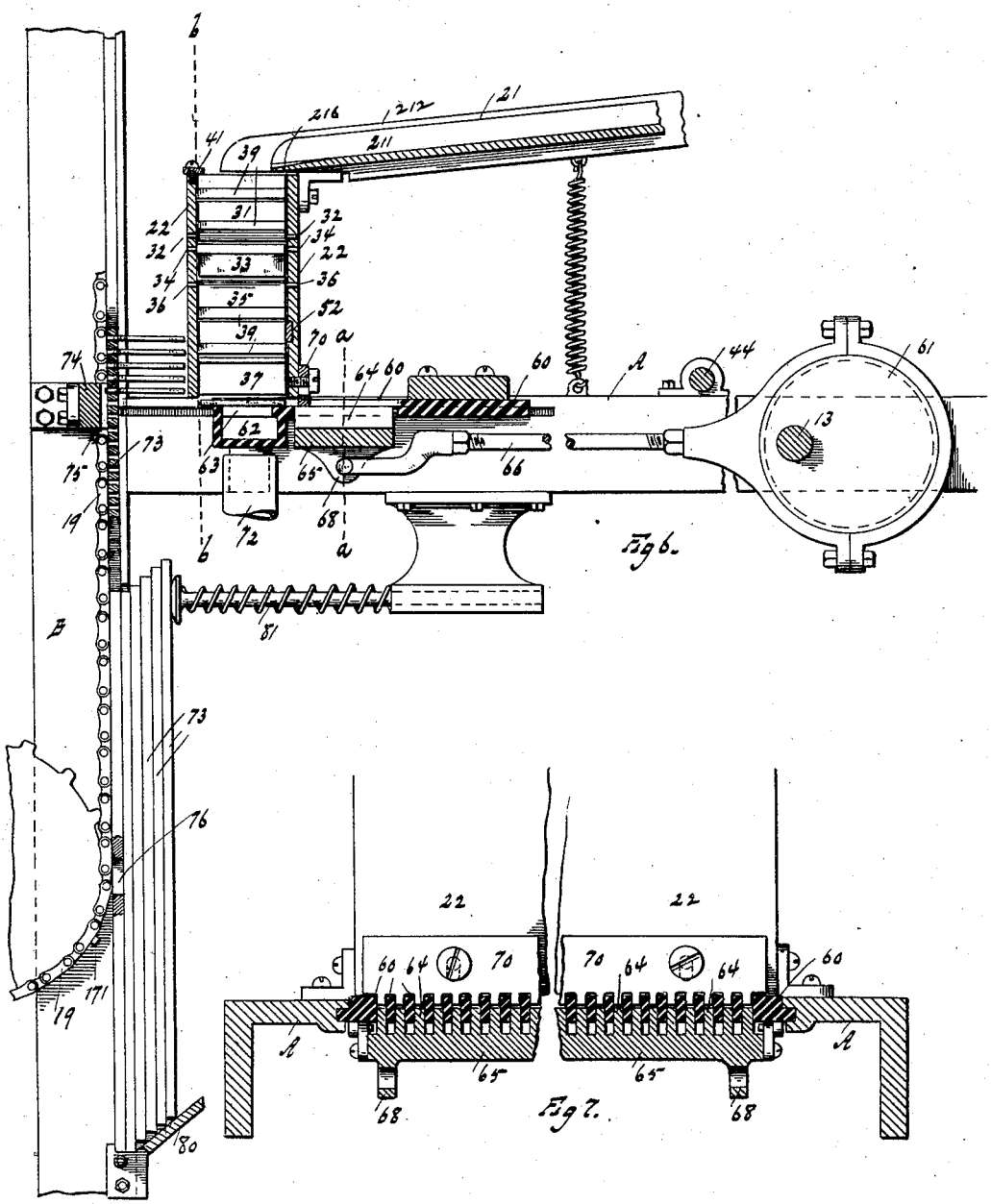

No. 727,547. PATENTED MAY 5, 1903.
H. C. LA FLAMBOY.
MATCH MACHINE.
APPLICATION FILED MAR. 27, 1902.
NO MODEL. 6 SHEETS—SHEET 4.
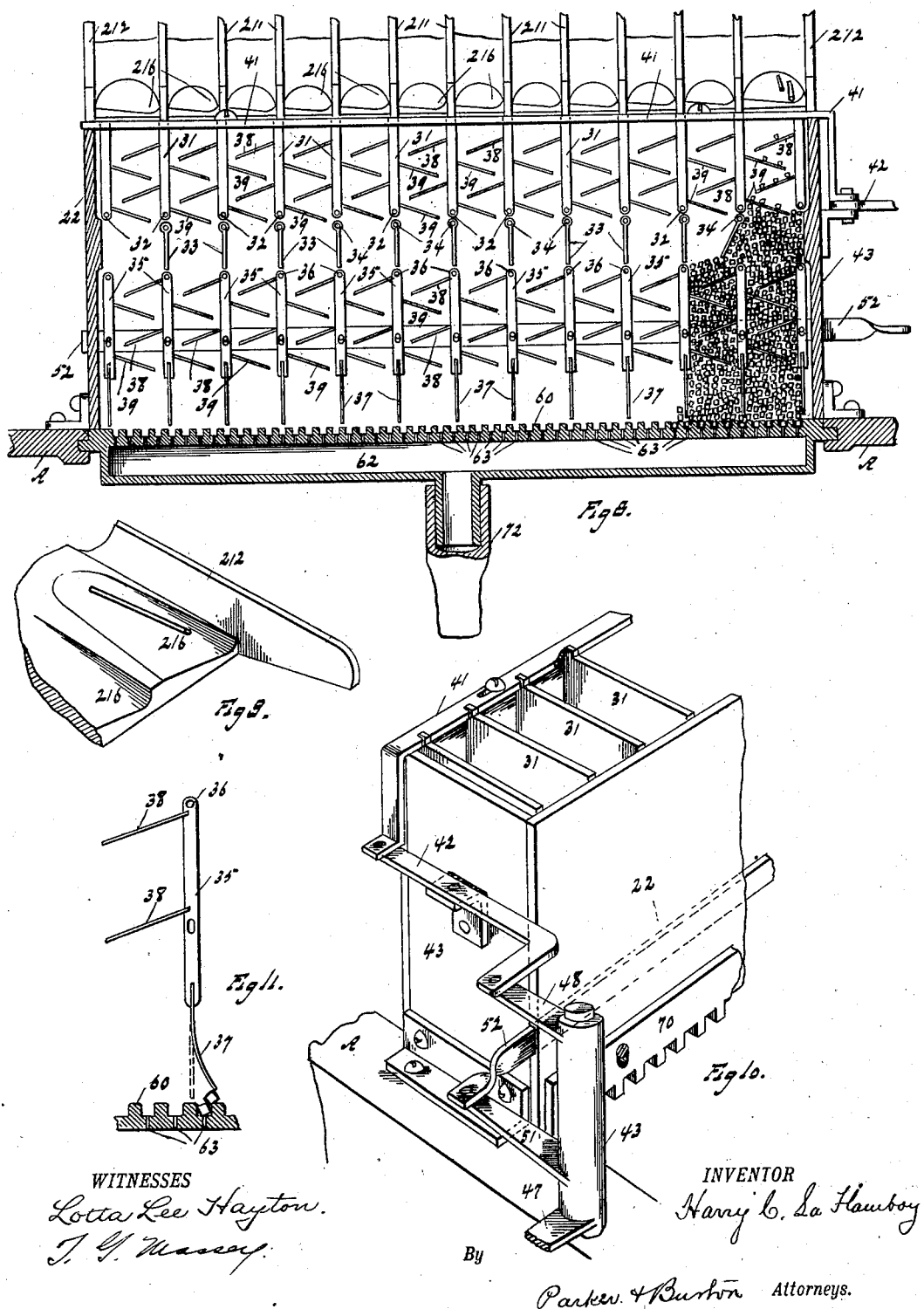
WITNESSES
Lotta Lee Hayton.
T. G. Massey.
INVENTOR
Harry C. La Flamboy
By Parker & Burton Attorneys.

No. 727,547. PATENTED MAY 5, 1903.
H. C. LA FLAMBOY.
MATCH MACHINE.
APPLICATION FILED MAR. 27, 1902.
NO MODEL. 6 SHEETS—SHEET 5.
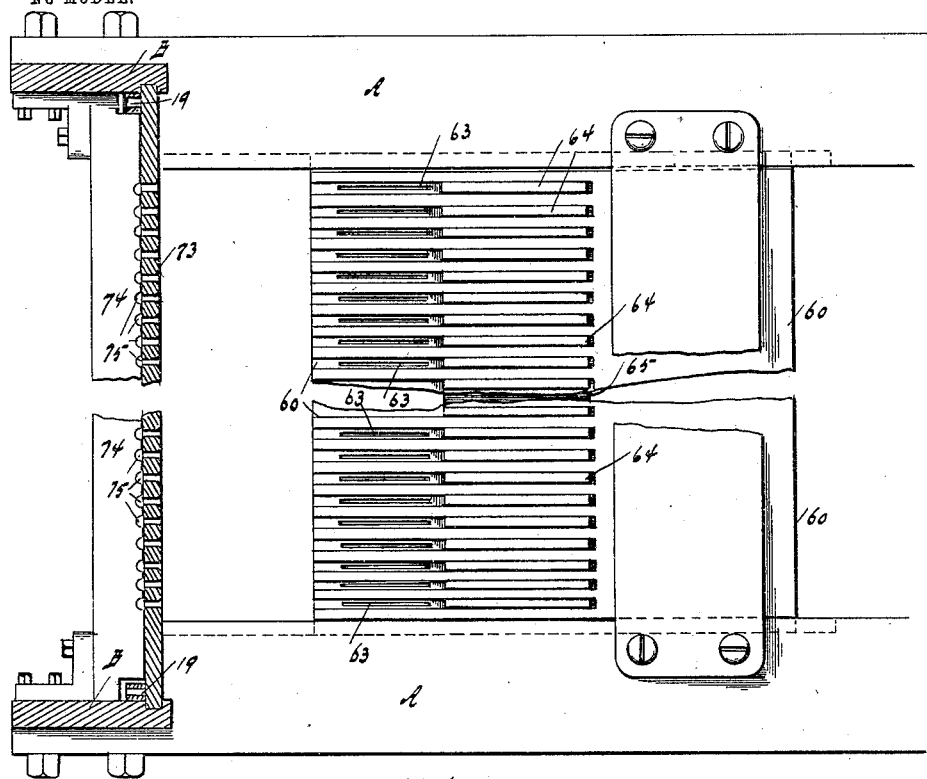
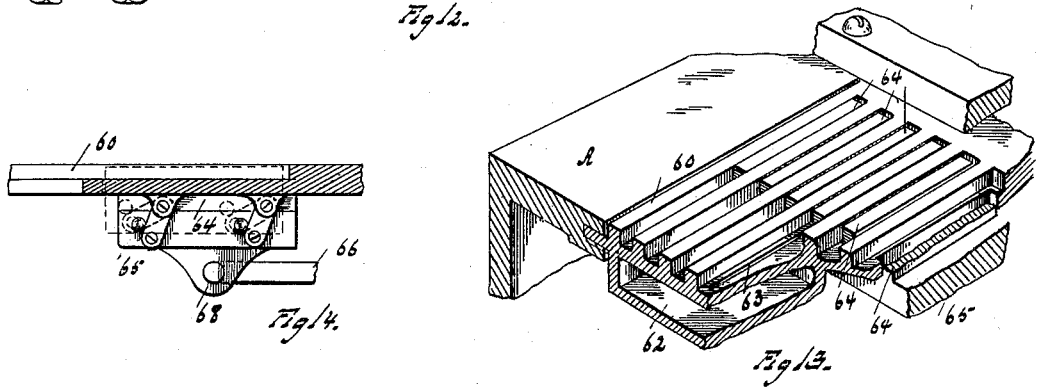
WITNESSES
Lotta Lee Hayton.
T. G. Massey.
INVENTOR
Harry C. La Flamboy
By Parker & Burton Attorneys.

No. 727,547. PATENTED MAY 5, 1903.
H. C. LA FLAMBOY.
MATCH MACHINE.
APPLICATION FILED MAR. 27, 1902.
NO MODEL. 6 SHEETS—SHEET 6.
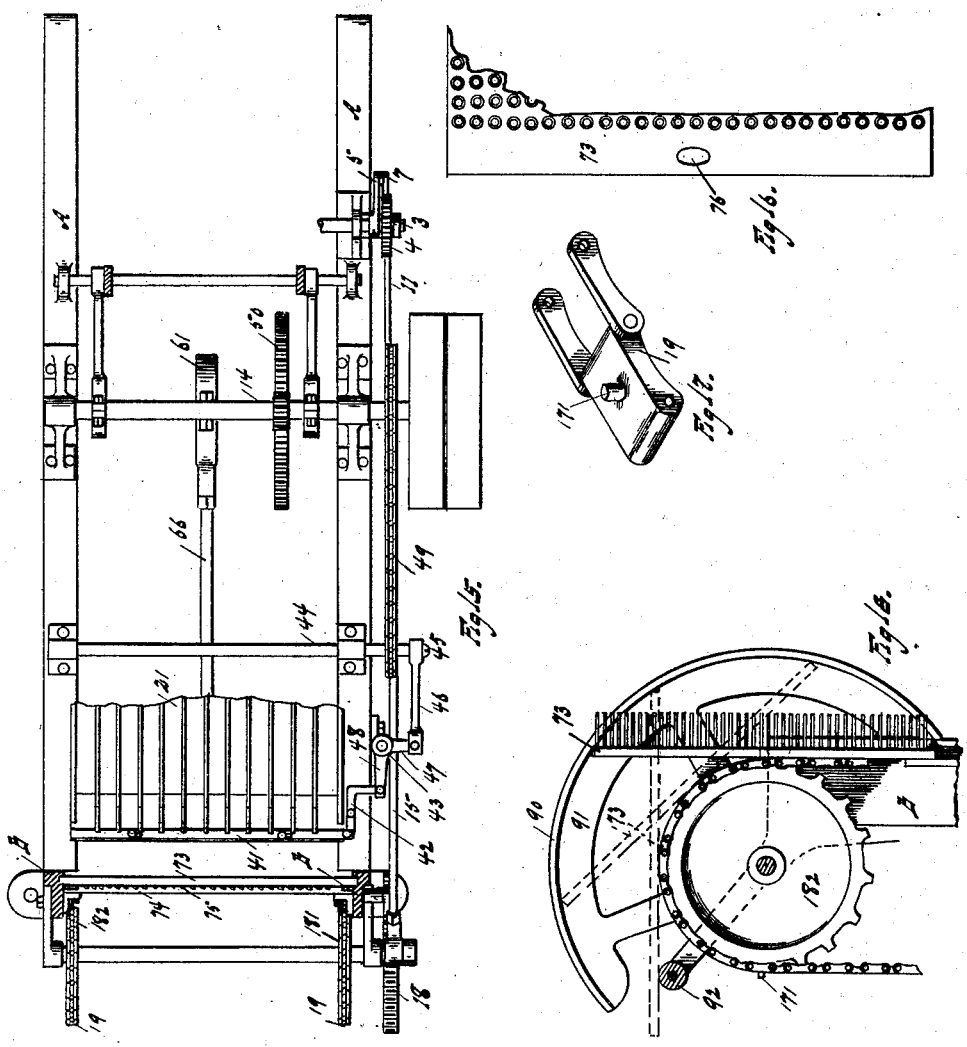
WITNESSES
Lotta Lee Hayton.
T. G. Massey
INVENTOR
Harry C. La Flamboy
By Parker & Burton Attorneys.

No. 727,547. Patented May 5, 1903.

UNITED STATES PATENT OFFICE.

HARRY C. LA FLAMBOY, OF DETROIT, MICHIGAN, ASSIGNOR OF TWO-THIRDS TO ROBERT THUNER AND BETHUNE DUFFIELD, OF DETROIT, MICHIGAN.

MATCH-MACHINE.

SPECIFICATION forming part of Letters Patent No. 727,547, dated May 5, 1903.

Application filed March 27, 1902. Serial No. 100,217. (No model.)

*To all whom it may concern:*

Be it known that I, HARRY C. LA FLAMBOY, a citizen of the United States, residing at Detroit, county of Wayne, State of Michigan, have invented a certain new and useful Improvement in Match-Making Machines' Plate-Fillers; and I declare the following to be a full, clear, and exact description of the invention, such as will enable others skilled in the art to which it pertains to make and use the same, reference being had to the accompanying drawings, which form a part of this specification.

This invention relates to match-making, and has for its object an improved machine for filling the dipping-plate employed in dipping match-splints.

The machine consists of a rotating screen, into which the match-splints which have been previously cut are thrown. The match-splints are dropped from the rotating screen onto a vibrating carrier, which is divided by longitudinal strips into a number of parallel raceways, down which the match-splints slide. In traveling down the raceways the match-splints are prevented from turning and reach the lower end of the races in a nearly straight, though not necessarily exactly straight, position parallel to the long axis to the raceways. In this course of travel the match-splints pass over a grating, which allows short splints, broken splints, and slivers to drop through and separate from the useful splints at the lower end of the raceways. The splints are directed into hoppers, which are divided vertically into a number of chambers by cross-partitions, each of which extends part way across the hopper. The partitions between the hoppers vibrate, and each partition carries a number of the division-plates, which divide the hoppers into chambers. Each of the vertical partitions has a flexible continuation on its lower end made of spring material, and the opening at the bottom of the hopper is closed by a plate having grooves between parallel ribs, spaced to a width to allow a single match-splint to drop between them. In the bottom of each groove there is a long narrow perforation, which is the mouth of an air-duct. In this same plate, behind and in line with the long air-mouths, are long narrow slots of the same width as that between the ribs, and these slots are filled by blocks that drop to the bottom of the grooves in the plate at times and at times rise between the ribs to the upper surface of the ribs. The blocks serve as plungers, and the blocks, with the plate on which they are formed, have a swinging and vertically-reciprocating motion underneath the plate previously mentioned. In front of the reciprocating plate is a mechanism for carrying the dipping-plates into which the match-splints are to be inserted, and there is means arranged to give to the dipping-plate a rising step-by-step motion at each reciprocation of the plungers. The match-splints drop into the grooves between the ribs. The plate carrying the plungers advances and swings upward behind the splints, and then the plate as a whole moves forward and forces those splints that occupy grooves into the holes bored into the dipping-plate, which stands vertically in front of the hopper. Then the plungers swing downward and retract, and the plate as a whole also retracts to allow a fresh charge of match-splints to enter the grooves between the ribs. The dipping-plate rises one step, and the plungers and the plate again advance to insert another charge of match-splints into the dipping-plate, and the action is continued. When the dipping-plate rises, a second plate follows it immediately, and the filled plate is automatically disengaged from the chain by which it was actuated and transferred to a carrier which conveys it away for further treatment.

In the drawings, Figure 1 is a side elevation of the assembled machine. Fig. 2 is a section across the axis of the screen which produces the initial straightening of the match-splints and shows a part of the raceboard below it. Fig. 3 is a section of the screen. Fig. 4 is a longitudinal section showing part of the race-board. Fig. 5 is a plan view showing part of the race-board. Fig. 6 is a longitudinal sectional elevation through the splint-hopper and the feeding mechanism underneath the hoppers. It shows also the sprocket-chain, the dipping-plates, and the means of attaching the dipping-plates to the sprocket-chain. Fig. 7 is a cross-section of the feed mechanism at the line $a\ a$ of Fig. 6. Fig. 8 is a cross-section through the hoppers at the line $b\ b$ of Fig. 6. Fig. 9 is a detail of the delivery end of the race-board. Fig. 10 is a perspective detail showing the hoppers and means for vibrating the upper sections of the partition-walls. Fig. 11 is a detail of a portion of the lower sections of the partitions. Fig. 12 is a plan of the bottom slide-feeding mechanism beneath the hoppers. Fig. 13 is a perspective detail of part of the apparatus shown in Fig. 12. Fig. 14 is a detail of the mechanism which lifts the plunger and retracts the lower slide. Fig. 15 is a plan view of the actuating mechanism of the machine. Fig. 16 is an elevation of an edge of the dipping-plate. Fig. 17 shows a link of the sprocket-chain. Fig. 18 shows the top sprocket-wheel and the means for unshipping the loaded plates therefrom.

2 indicates the screen on a shaft journaled in an arm 3, that rises from the main frame A, and provided with a feed ratchet-wheel 4, that is actuated by a ratchet-lever 5, link 6, and pawl 7. The link 6 is adjustably connected to a rock-arm 8 on a rock-shaft 9, which is journaled in the main frame, and the arm 10 of the rock-arm is connected by a link 11 to an eccentric-strap 12 on a counter-shaft 13, that is geared to the main shaft 14 of the machine. The screen 2 is given an intermittent rotary motion by the mechanism just described, and the amount of each advance movement is regulated by shifting the connection between the link 6 and the rock-arm 8. The counter-shaft 13 actuates the eccentric 121, and the eccentric-strap 12 is connected by link 15 to a ratchet, which is a sprocket-wheel that drives the sprocket-chain 19. The sprocket-chain 19 belts the sprocket-wheel 181 and the sprocket-wheel 182, and it is provided at intervals with links from which project pins 171. (Shown in Fig. 17.) On the same shaft with the eccentric 121 is an eccentric 61, Fig. 6, which actuates the feed mechanism hereinafter to be described, and the two eccentrics 121 and 61 are arranged on the shaft to time the movement of the ratchet-wheel 18 and its sprocket-wheel 181 properly with respect to the feed movement of the match-splints.

Beneath the revolving screen is a race-board 21, which extends to the rear of the screen far enough to catch any match-splints which may be carried up and partially around the screen and extends to the front of the screen to the hoppers. This race-board 21, Figs. 4 and 5, is divided by longitudinal strips into a number of races or channels 210, each of which is separated from its adjacent channel by a rib 211, and the outer races are walled by side strips 212. The entire race-board slants downward toward the hoppers 22, and it is preferably divided by steps 213 and 214. At one point in its descent it is cut by cross-slots that extend entirely across the board, the slots being between bars 215, the upper surface of which is tangent to a plane with the race-board, but rounded somewhat, and the distance between adjacent cross-bars 215 is less than the length of the match-splint, but great enough to allow splints less in length than the normal to drop through, and the cross-bars cause broken and imperfect splints and slivers to be culled out from commercial splints. The upper surface of the longitudinal bars 211 at one point in its course makes a sharp descent from a high level 213 to a lower level 214, and this place of sharp descent causes any match-splints which may have dropped and bridged across from one bar to another to drop into a race between the bars. The bottom surface of each raceway is warped, so that at one side the slant of the descent is considerably sharper than at the other, as illustrated at 216 in Fig. 9. The match-splints pass from the raceways into the open upper ends of hoppers. (Illustrated best in Figs. 8, 10, and 11.) These hoppers are a series of vertical chambers, between the fore-and-aft walls of which the ends of the match-splints engage. The partitions between the chambers are vibratory, and each portion comprises an upper section 31, which vibrates on a pin 32. Below this is a hanging door-like section 33, that swings laterally in either direction on a pivot 34. Below the door-section 33 is a vibratory section 35, that swings on a pin 36 and is vibrated by a cross-bar 52. The lower part of this section 35 terminates with a blade 37, that vibrates with the section 35, but is capable of bending somewhat or yielding on occasions, as indicated in Fig. 11, should a match-splint catch in the delivery-groove in a way to prevent the free oscillation. Each of the vibrating sections 31 and 35 is provided on each side with wings 38, that alternate with similar wings 39 on the adjacent section. The wings 38 are rigidly secured to the section to which they are attached, and at each oscillation of the section the outer edge or free edge rises and falls and serves to continually work downward the match-splints in the hopper. Should the feed to any one of the chambers be too great, so that one hopper becomes filled above the swinging doors 33 while an adjacent hopper is not filled above the doors, the surplus or the excess crowds the door 33 open and allows the splints from the full chamber to pass into and occupy the empty space in the adjacent hopper, and this compensates for any irregularity in the feed from the screen 2 into the raceways.

The vibratory walls 31 are actuated by any suitable means, that shown in the drawings being a cross-bar 41, (seen in Fig. 10,) that is provided with notches, which notches engage pins in the sections 31. The bar 41 is itself reciprocated by a lever 42, pivotally connected with the end board 43, which forms a part of the casing of the hopper. The lever 42 is actuated by an arm 48, extending from a rock-shaft 43, and this in turn is actuated by suitable gearing driven from the main shaft 14. The means shown in the drawings for producing this reciprocatory movement of the rock-shaft 43 is a counter-shaft 44, upon which there is an eccentric 45, connecting by a pitman 46 to a rock-arm 47 of the rock-shaft 43. The shaft 44 is driven by a sprocket-chain 49 from a sprocket-wheel 50 on the main shaft 14. The rock-shaft 43 is provided with a rock-arm 51, that connects with a reciprocating bar 52, and this bar 52 is connected with the lower sections 35 of the portions and serves to oscillate these lower sections. The lower sections 35 are provided with wings 38 and 39 and which serve the same purpose in the lower chambers of the hopper. Each lower section 35 has attached to its lower end a spring extension or blade 37, that swings above the notched feed-plate 60. A feed-plate 60 (which will be best understood by examining Figs. 7, 12, 13, and 14) lies under the hoppers. This feed-plate has a reciprocatory motion from back to front of the machine of a little more than the length of a match-splint. It is provided on its upper side with grooves that extend in a direction longitudinal of the machine, and each groove is of a width and depth sufficient to receive a single match-splint and no more. Should a match-splint enter cornerwise or diagonally and another match-splint be crowded into the angle, as indicated in Fig. 11, the spring-blade 37 bends slightly, and the match is not broken or split and does not clog up the machine, as would be the case if the blade could not yield. The bottom of each groove in plate 60 for a space back from the forward end of the plate that is slightly less than the length of the match is provided with a long narrow slit that passes through the bottom of the groove and forms the mouth-opening 63 to an air-chamber 62, that is located beneath the plate. Behind the narrow slit 63 is a wider slot, through which runs a block 64, spoken of hereinbefore as the "plunger." This block 64 (there is a block for each groove and the grooves are of equal number to the holes in a row across the dipping-plate) may be considered as a rib on a plate 65, that extends across under the feed-plate 60 and is connected to the plates 60 by suitable swinging links. The plate 65 is actuated by a reciprocating pitman 66 from the eccentric 61. The pitman 66 engages directly with a lug 68, formed on plate 65. In the first part of the movement toward the front the plate 65 rises to force the blocks 64 up through the slots in plate 60, and in the first part of the movement toward the rear it falls to draw blocks 64 downward until their upper surface is level with the bottom of the grooves. The rising movement of the blocks takes place with the first part of the forward movement of the pitman 66 and precedes the forward movement of the plate 60. The blocks are held in their lifted position during all of the forward movement of the plate 60. The drop of the blocks or plungers 64 at the beginning of the backward movement leaves the slot open for a fresh supply of match-splints. The match-splints are prevented from drawing back with the plate by a sliding stop-plate 70, (seen in Fig. 7,) that rides on the top of the blocks 64. At the end of the backward movement of the plate 60 that part of the plate in which the narrow slits 63 are located is filled with matches, one match lying in each groove, and they are held. To the air-chamber 62 is connected an exhaust-air pipe 72, into which there is constant suction through the narrow slits 63, and this suction tends to hold the match-splints in place by the air-pressure acting upon the match-splints lying over the opening 63. On the forward stroke of the plate 60 the match-splints are held under this suction and are prevented from flying or escaping from the grooves after the plate has passed from under the hopper and during the time that the splints are in transit from the hopper to the dipping-plate. The plate 60 is advanced across the space between the hoppers and the dipping-plate 73 with the splints projecting slightly beyond the end of the plate 60, and the projecting ends of the splints are driven into the holes of the dipping-plate. The dipping-plate 73 is supported by a backing-up bar 74, that is rigidly attached to the machine and is provided with vertical grooves 75, that furnish clearance for the end of any match-splint should its end project through the dipping-plate. The dipping-plate 73 is connected to the sprocket-chain 19 by the pins 171, formed on certain links of the sprocket-chain 19, entering holes 76 in the edges of the plate. (See Fig. 16.) The dipping-plates are thus lifted by the sprocket-chains, as has been described, to present a fresh row of holes with each retrograde movement of the feed-plate 60, and the dipping-plate remains in position during the advance movement of the feed-plate and until the match-splints have been driven into the holes in the dipping-plate. There are a number of dipping-plates placed on a bracket 80, that projects from the post B of the frame, and the upper ends are held by a spring-rest 81, pressing against the plate that is rising. The weight of the plate causes it to slip down on the slanting upper surface of the bracket 80, so that the low edge of the front face is always in position to engage the pins 171. The plate simply hangs on the pins 171 and is held between guides on the standard B while being lifted by the chain. After the plate has been filled and after its lower edge rises above the hoppers its upper edge engages under the overhanging flange 90 of a curved guide 91. The chain still continues to lift the plate, and the plate swings, as indicated in dotted lines in Fig. 18, until the forward part of it rests on a roller 92, that sustains the plate in its now horizontal position, and the pins on the chain sink away from it. The next plate pushes it forward on a track or endless carrier, from which it is removed by the operator.

In the structure thus described the novel features embrace, first, the rotary screen 2, into which the match-splints are thrown in a confused mass and which effects their primary distribution in substantially uniform amount over the shaking-raceways beneath in such a way that they are compelled to finally drop to lie lengthwise of the race. This device while it has the construction of a screen used to separate different grades of material does not have that use in the present case, but is employed simply as a straightener to compel the splints to drop in a particular way through the meshes of the screen, and this is aided by providing the screen with interior annular ribs 2$^a$.

A second novel feature is found in the construction of the raceways with cross grating-bars 215, which so form a screen and which serve to let pass short splints, broken splints, and splinters or slivers and separate them from the good splints.

A third feature of novelty is found in the vibrating partition-walls 31, provided with the obliquely-extending wings 38, to which are given the peculiar motion described.

A fourth feature of novelty is found in the swinging door-like device 33, with its function, as described.

A fifth feature of novelty is found in the swinging partitions 35, with their downwardly-extending elastic flexible extensions 37.

A sixth feature of novelty is found in the feed-plate, having the suction apparatus attached to it and provided with the mouths to which the match-splints resting in the grooves are drawn and having the vertically-movable plungers, which are employed to force the splints into the opening of the dipping-plates.

These are the principal novel features embodied in the device, which with other minor features will be pointed out more specifically in the claims.

What I claim is—

1. A device for laying match-splints lengthwise in a raceway, comprising a rotatable screen and means for moving the same, and a raceway located underneath said screen and arranged to receive splints dropping endwise through the meshes thereof, substantially as described.

2. A device for laying match-splints lengthwise in a raceway, comprising a rotatable screen provided with interior annular ribs and with a screen-surface between said ribs, and a raceway arranged underneath said screen, and arranged to receive splints dropping through the meshes of said screen, substantially as described.

3. In a device for placing match-splints into holes in a plate, the combination with means for dropping splints into a trough, a race-trough arranged to be vibrated and having the bottom of each raceway formed of a warped surface so as to furnish raceways having one of their sides lower than the other at the delivery end, substantially as described.

4. In a hopper for arranging match-splints to be placed in the holes of a dipping-plate, the combination of stationary end walls, vibratory partitions forming a section of the hopper, a wing-like plate extending from each vibratory partition diagonally downward and partially across a chamber of the hopper, the said wing-like walls being fixed to the vibratory partition, substantially as described.

5. In a hopper for arranging match-splints to be delivered to a dipping-plate, the combination of stationary end walls, vibratory partitions or side walls to each section of the hopper, a wing-like plate extending from each vibratory wall diagonally downward and partially across a chamber of the hopper, the said wing-like walls being fixed to the vibratory side wall and also alternating with a like wing-wall projecting from the opposite vibratory wall of a section of the hopper, substantially as described.

6. In a machine for arranging match-splints in a dipping-plate, a hopper divided into chambers by partition-walls, each partition being formed of a top and bottom section and with a swing-door-like section between the upper and lower sections arranged to allow the exit of an excess of match-splints from one chamber into an adjacent chamber, substantially as described.

7. In a hopper for arranging match-splints to be placed in a dipping-plate, the combination of vertical partition-walls dividing the hopper into chambers, each of said partition-walls being divided into three sections, the intermediate one of the three being arranged to swing to allow the exit of an excess of splints from the upper part of a full chamber into an adjoining chamber, substantially as described.

8. In a machine for arranging match-splints to be placed in a dipping-plate, a hopper divided into chambers by partition-walls, each partition being formed of a top and bottom section and with a swinging door-like structure between the upper and lower sections arranged to allow the exit of an excess of match-splints from one chamber into an adjacent chamber, and means for vibrating the upper section of said partition, substantially as described.

9. In a machine for arranging match-splints in a dipping-plate, a hopper divided into chambers by partition-walls, each partition being formed of a top and bottom section and with a swinging door-like section arranged between to allow the exit of an excess of match-splints from one chamber into an adjacent chamber, and means for vibrating the lower section of said partition, substantially as described.

10. In a machine for arranging match-splints to be inserted in a dipping-plate, a hopper divided into chambers by vertical vibratory division-walls, a grooved feed-plate closing the bottom of said hopper, a spring-blade at the bottom of each division-wall arranged to vibrate in close proximity over the grooved plate and adapted to yield in case its vibration is obstructed, substantially as described.

11. In a machine for inserting match-splints into a perforated plate, in combination with means for supporting the plate and actuating the same with a vertical step-by-step movement, a hopper to arrange the match-splints in straight form, a grooved feed-plate closing the bottom of said hopper, an air-chamber underneath the plate, air-openings through the plate into the air-chamber, means for producing a suction through said openings, a flexible connection between the air-chamber and said means for producing suction, and means for reciprocating the feed-plate and the air-chamber, substantially as described.

12. In a machine for inserting match-splints into a dipping-plate, in combination with mechanism for arranging the match-splints in close order and parallel arrangement in hoppers, a grooved feed-plate arranged to reciprocate under the hoppers, a reciprocating air-chamber under the feed-plate, a plunger arranged for vertical movement through an opening in the grooved feed-plate and adapted to engage behind the match-splints and to reciprocate with the feed-plate to force the match-splints into the dipping-plate, means for producing suction in said air-chamber, and air connections uniting the air-chamber and the means for producing suction, substantially as described.

13. In a machine for inserting match-splints into a dipping-plate, the combination with a hopper arranged to hold match-splints in close parallel arrangement, a grooved feed-plate forming a closure of the bottom of said hopper, a plunger arranged to be projected through an opening in the feed-plate into the groove behind the match-splints therein, means for reciprocating the feed-plate and the plunger, and means for holding the splint in the groove by air-pressure during the forward travel of the grooved feed-plate, substantially as described.

14. In a machine for inserting match-splints into a dipping-plate, in combination with mechanism for producing a step-by-step movement of the dipping-plate, means for reciprocating a splint-carrying plate and producing a forward movement thereof during the cessation of movement of the dipping-plate and a return or back movement thereof contemporaneous with the advance movement of the dipping-plate, a plunger arranged to engage behind the splints preparatory to the forward movement of the feed-plate, and to drop leaving the groove empty preparatory to the return movement of the feed-plate, means for producing an air-pressure on the surface of the splint, and connections whereby said air-pressure is continuous during the movement of the feed-plate, and a vertical movable splint-stop arranged to ride on said plungers, substantially as described.

15. In combination with a feed-plate adapted to receive and carry a match-splint forward from a hopper, an air-chamber arranged to travel with said feed-plate, air-openings through the feed-plate into the air-chamber, a flexible connection uniting the air-chamber with an exhaust-air pipe, whereby there is produced an air-pressure to hold match-splints to the plate during its advance movement, substantially as described.

16. In a machine for inserting match-splints in a dipping-plate, the combination with a vertically-movable conveyer for the dipping-plate, an obliquely-arranged bracket adapted to engage the lower edge of a plurality of plates, and a spring-actuated holder arranged to engage behind the upper edge of the rearmost of said plurality of plates and to press the upper edges of the plates forward, whereby they are in position to successively engage the conveyer, substantially as described.

17. A device for laying match-splints lengthwise comprising a rotatable screen, means for moving the same, means located under the screen arranged to receive the splints dropping endwise through the interstices thereof and to convey the splints from under said screen, substantially as described.

In testimony whereof I sign this specification in the presence of two witnesses.

HARRY C. LA FLAMBOY.

Witnesses:
CHARLES F. BURTON,
ELLIOTT J. STODDARD.